United States Patent
Chudolij et al.

(10) Patent No.: US 12,152,342 B2
(45) Date of Patent: Nov. 26, 2024

(54) METHOD FOR PRINTING ONTO A NONWOVEN SUBSTRATE

(71) Applicant: SUN CHEMICAL CORPORATION, Parsippany, NJ (US)

(72) Inventors: Alex Chudolij, Carlstadt, NJ (US); Richard Bianchi, Carlstadt, NJ (US); Arnold Gibaldi, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/916,765

(22) PCT Filed: Apr. 22, 2021

(86) PCT No.: PCT/US2021/028571
§ 371 (c)(1),
(2) Date: Oct. 3, 2022

(87) PCT Pub. No.: WO2021/216826
PCT Pub. Date: Oct. 28, 2021

(65) Prior Publication Data
US 2023/0151541 A1    May 18, 2023

Related U.S. Application Data

(60) Provisional application No. 63/014,783, filed on Apr. 24, 2020.

(51) Int. Cl.
| | |
|---|---|
| D06P 1/52 | (2006.01) |
| C09D 11/03 | (2014.01) |
| C09D 11/102 | (2014.01) |
| C09D 175/08 | (2006.01) |
| B41M 1/30 | (2006.01) |

(52) U.S. Cl.
CPC ............ D06P 1/5285 (2013.01); C09D 11/03 (2013.01); C09D 11/102 (2013.01); C09D 175/08 (2013.01); B41M 1/305 (2013.01)

(58) Field of Classification Search
CPC ..... D06P 1/5285; C09D 11/03; C09D 11/102; C09D 175/08; B41M 1/305
See application file for complete search history.

(56) References Cited

U.S. PATENT DOCUMENTS

| | | | |
|---|---|---|---|
| 4,349,640 A | 9/1982 | Keeney et al. | |
| 5,695,855 A | 12/1997 | Yeo et al. | |
| 7,205,041 B2 | 4/2007 | Nair et al. | |
| 7,416,777 B2 | 8/2008 | Nair et al. | |
| 7,727,353 B2 | 6/2010 | Nair et al. | |
| 8,216,666 B2 | 7/2012 | Warner et al. | |
| 8,236,385 B2 | 8/2012 | Yahiaoui et al. | |
| 8,383,699 B2 | 2/2013 | Williams, Jr. et al. | |
| 8,759,442 B2 | 6/2014 | Steiner et al. | |
| 2006/0217497 A1* | 9/2006 | Kitada | C08G 18/0823 525/453 |
| 2008/0255275 A1* | 10/2008 | Williams | C09D 11/033 524/401 |
| 2009/0220751 A1* | 9/2009 | Warner | A61F 13/15203 428/195.1 |
| 2016/0279002 A1 | 9/2016 | Sauer et al. | |

FOREIGN PATENT DOCUMENTS

| | | |
|---|---|---|
| WO | WO 02/051644 A1 | 7/2002 |
| WO | WO 2007/056660 A1 | 5/2007 |
| WO | WO 2009/058137 A1 | 5/2009 |
| WO | WO 2010/114899 A1 | 10/2010 |
| WO | WO 2017/176671 A1 | 10/2017 |
| WO | WO-2021021151 A1 * | 2/2021 ............. B41M 5/52 |

OTHER PUBLICATIONS

International Search Report issued in International Application No. PCT/US21/28571 issued Jul. 30, 2021.
Written Opinion of the International Searching Authority issued in International Application No. PCT/US21/28571 issued Jul. 30, 2021.
International Preliminary Report on Patentability (Chapter 1 of the Patent Cooperation Treaty) issued in International Application No. PCT/US21/28571, mailed Apr. 22, 2022.
Technical Data Sheet. Prospector® Ultrus™ Prospector® Surkopak® 5323. BIP (Oldbury) Ltd, 2 pages.
Product Data Sheet. Texin® RxT70A10R5.Covestro LLC, 5 pages. Edition Sep. 27, 2017.

* cited by examiner

*Primary Examiner* — Robert S Walters, Jr.

(74) *Attorney, Agent, or Firm* — Marian E. Fundytus; Ostrolenk Faber LLP.

(57) ABSTRACT

The present invention provides ink and coating compositions for printing on non-woven substrates or fabrics. Advantageously, the compositions of the invention can be used either as one component (1K) or two component (2K) ink systems. The compositions of the invention exhibit improved properties, such as ink adhesion ratings, as shown by a rub test, compared to commercially available inks designed to be printed on non-woven substrates.

9 Claims, No Drawings

METHOD FOR PRINTING ONTO A NONWOVEN SUBSTRATE

CROSS REFERENCE TO RELATED APPLICATIONS

The present application is a § 371 National Phase application based on PCT/US2021/028571 filed Apr. 22, 2021, which claims the benefit of U.S. Provisional Application No. 63/014,783, filed Apr. 24, 2020 the subject matter of each of which is incorporated by reference in their entirety.

FIELD OF THE INVENTION

The present invention is related to ink and coating compositions for printing on non-woven substrates or fabrics. The present invention is also related to methods of printing ink and coating compositions on non-woven substrates. These non-woven substrates are used for a variety of end-use applications, such as disposable diapers, feminine hygiene products, packaging, medical gowns and face-masks, as well as other uses.

BACKGROUND OF THE INVENTION

Existing ink systems for printing on non-woven substrates suffer from a number of problems. One problem is inadequate mineral oil crock resistance across a broad range of non-woven substrates. Another problem is the need to use a hardener or catalyst to create two-part (2K) systems that have pot-life or shelf-life limitations once inoculated with hardener or catalyst.

U.S. Pat. No. 5,695,855 discusses a printed non-woven polyolefin substrate printed with an adhesive ink. The ink comprises suitable solvent-based binders, which include polyurethanes. There is no disclosure of a nitrocellulose resin as a suitable binder for the ink.

U.S. Pat. No. 8,216,666 describes printed non-woven web substrate, printed with water-based inks. In some embodiments, the printed inks have a crockfastness of about 2.5 or higher. The ink may contain a polyurethane dispersion, which is defined as a catalyst containing, unblocked, fully reacted polyurethane water dispersion. The non-woven substrates may have a low surface energy, and may be corona discharge-treated to increase the surface energy. The inks may contain colorants (pigments/dyes), which may include acrylic colloidal dispersions, acrylic solution, or surfactants and water. There is no disclosure of a nitrocellulose resin as a suitable binder for the ink.

US 2016/0279002 discloses printing non-woven substrates with a reactive ink composition. The inks may contain colorants (pigments/dyes), which may include acrylic colloidal dispersions, acrylic solution, or surfactants and water. Although a long list of suitable binders is described, the preferred binder for the ink composition is a mixture of polyvinylbutyral and nitrocellulose.

U.S. Pat. Nos. 7,205,041, 7,416,777, and 7,727,353 disclose an ink printed substrate web that exhibits improved rub resistance. An ink film is printed on the substrate, and a coating film is applied on top of the ink film. The ink film alone does not exhibit good rub resistance. Nitrocellulose is not disclosed as a suitable polymer for the ink or the coating.

U.S. Pat. No. 8,236,385 describes a polymeric substrate (e.g. hydrophobic polyolefins) that is coated with a primer composition. The primer composition comprises a polyurethane. There is no disclosure of nitrocellulose in either the primer composition, or the ink applied on top of the primer.

U.S. Pat. No. 8,383,699 discloses a flexographic and/or rotogravure printing ink composition containing polyurethane resin, solvent, and colorant, which is suitable for printing on non-woven substrates. The polyurethane resin is preferably aliphatic. The printing ink optionally, but preferably, contains nitrocellulose resin. There is no disclosure of using a plasticizing aromatic polyurethane resin. There is no disclosure of corona treating the substrate prior to printing.

U.S. Pat. No. 8,759,442 discloses waterborne compositions comprising water-based polyurethane, water, and colorant, which are suitable for printing on non-woven substrates. The composition may comprise up to only about 10% compatible organic solvents. There is no disclosure of corona treating the substrate prior to printing.

There remains a need for inks, and a method of printing inks on non-woven substrates, wherein the printed inks exhibit good crockfastness (i.e. ink adhesion rating as measured by a rub/abrasion test), without the use of primers or overcoats. There is also a need for one component printing inks that contain no catalyst that are suitable for printing on non-woven substrates.

SUMMARY OF THE INVENTION

It has surprisingly been found that ink adhesion and rub resistance of printed inks on non-woven substrates can be achieved by using a specified amount of corona discharge treatment on the substrate, and using inks comprising polyurethane dispersions, preferably solvent-based, combined with nitrocellulose base colorants. Advantageously, in certain embodiments, the inks of the invention contain no catalysts, and can be used as a one-component (1K) system.

In a particular aspect, the present invention provides a method of producing a printed non-woven substrate, comprising:
(a) providing a non-woven substrate, wherein the non-woven substrate has been treated by corona discharge at a level of 0.5 kW/100 fpm to 3 kW/100 fpm, and has a surface energy of 30 to 50 dynes/cm at 72° F.;
(b) applying one or more layers of an ink or coating composition (A) to the substrate, wherein the ink or coating composition (A) comprises:
  i. one or more polyurethane resin dispersions, in an amount of 20 wt % to 80 wt %, based on the total weight of the composition, wherein the resin dispersions have a solids content of 40% to 90%; and
  ii. one or more additional solvents, in an amount of 20 wt % to 80 wt %, based on the total weight of the composition;
  iii. wherein composition (A) contains no catalysts; and
  iv. wherein composition (A) is a one-part system; and
(c) drying the composition (A) on the substrate;
wherein the dried ink composition (A) has an ink abrasion resistance (IAR) rating of equal to or greater than 4.0.

In another aspect, the composition further comprises a colorant base, wherein the colorant base is in the form of a pigment or dye dispersed in a nitrocellulose resin.

The present invention also provides articles comprising the printed non-woven substrates.

These and other objects, advantages, and features of the invention will become apparent to those persons skilled in the art upon reading the details of the formulations and methods as more fully described below.

DETAILED DESCRIPTION OF THE INVENTION

The present invention provides ink and coating compositions that are useful for printing on non-woven substrates that are used for a wide variety of end-use applications, such as disposable diapers, feminine hygiene products, packaging, medical gowns and masks, and the like.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

DEFINITIONS

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, "non-woven substrate" or "non-woven fabric" refers broadly to sheet or web structures bonded together by entangling fiber or filaments (and by perforating films) mechanically, thermally or chemically. They are typically flat, porous sheets that are made directly from separate fibers or from molten plastic or plastic film. They are not made by weaving or knitting, and do not require converting the fibers to yarn. Examples of the chemical types of non-wovens include polyethylene terephthalate (PET), polypropylene, polyester, cellulosic types, rayon, and the like.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, the terms "hardener" or "catalyst" refer to compounds that facilitate curing of inks and coatings. The terms "hardener" and "catalyst" are used interchangeably herein.

As used herein, "inks and coatings," "inks," and "coatings" are used interchangeably, and refer to compositions of the invention, or, when specified compositions found in the prior art (comparative). Inks and coatings typically contain resins, solvent, and, optionally, colorants. Coatings are often thought of as being colorless or clear, while inks typically include a colorant.

Throughout this disclosure, all parts and percentages are by weight (wt % or mass % based on the total weight) and all temperatures are in ° C. unless otherwise indicated.

Printing Inks and Methods of Use on Non-Woven Substrates

The present invention provides 1 component (1K) and 2 component (2K) ink and coating systems for non-woven substrates. Preferably, the ink and coating systems of the invention are 1K.

Non-woven substrates can be used for a wide variety of end-use applications. Applications for non-woven substrates include, but are not limited to, disposable diapers, feminine hygiene products, packaging, medical gowns, facemasks, and the like.

Non-woven fabrics are broadly defined as sheet or web structures bonded together by entangling fibers or filaments (and by perforating films) mechanically, thermally, or chemically. They are typically flat, porous sheets that are made directly from separate fibers or from molten plastic or plastic film. They are not made by weaving or knitting, and do not require converting the fibers to yarn. Examples of chemical types of non-woven substrates include polyethylene terephthalate (PET), polypropylene, polyester, cellulosic types, rayon, and the like. In some embodiments, non-woven fabrics are made from plastic resins, such as nylon, polyester, polyethylene, or polypropylene, and are assembled by mechanically, chemically, or thermally interlocking the plastic fibers. There are two primary methods of assembling non-woven fabrics, the wet laid process and the dry laid process. A dry laid process, such as the "meltblown" method, is typically used to make non-woven diaper fabrics. In this method the plastic resin is melted and extruded, or forced, through tiny holes (spinnerets) by air pressure. As the air-blown stream of fibers cools, the fibers condense onto a sheet. Heated rollers are then used to flatten the fibers and bond them together. Polypropylene is typically the material used for the permeable top sheet of diapers, while polyethylene is the resin of choice for the non-permeable back sheet of diapers.

Existing 1K and 2K ink systems for non-woven substrates suffer from a number of different problems. For example, existing systems generally exhibit inadequate crock resistance across a broad range of non-woven substrates. Another problem is the need to use a hardener or catalyst to create 2K systems that have pot-life or shelf-life limitations once inoculated with hardener or catalyst.

One part (1K) systems generally refer to ink systems that are used as supplied, i.e. without the need for the addition of a hardener or catalyst. Two part (2K) systems refer to ink systems that require inoculation with a hardener or catalyst immediately prior to use. Once inoculated, existing 2K systems begin losing their resistance properties soon thereafter, typically with 1 to 5 hours. After this time, they may no longer be usable as their resistance properties are rendered insufficient. In some cases, existing 2K ink systems can be re-inoculated with hardener or catalyst to restore their resistance properties for an additional period of time, typically an additional 1 to 5 hours, before they once again become unusable. It may be possible to re-inoculate prior art 2K systems a second time. However, additional re-inoculation (i.e. third, fourth, etc. inoculation) cannot restore the resistance properties of prior art 2K systems, and/or the inks gel and become completely unusable. Such inks may be discarded, leading to waste that can create environmental repercussions. Advantageously, the 2K ink systems of the present invention can be re-inoculated greater than two time (e.g. three or four time), restoring the resistance properties, and remaining usable. Using the 2K ink systems of the present invention thus leads to a reduction in waste.

In a preferred embodiment, the 1K and/or 2K ink systems and methods of the present invention will meet stringent customer demands for mineral oil crock resistance. In another preferred embodiment, the 2K ink systems and methods of the present invention will retain their resistance for a longer period of time after inoculation, and/or can be re-inoculated multiple times while still maintaining their resistance properties. In another preferred embodiment, the ink systems and methods of the present invention can be used in a 1K system as supplied, and do not require catalyst.

A further deficiency of the existing prior art 2K ink and coating technology for non-woven substrates is relatively short pot-life. In one embodiment, pot-life can be defined as the length of time an ink will maintain its properties (e.g. resistance properties, adhesion to the substrate, and the like) after inoculation. Existing 2K ink systems will only remain useable for a relatively short time (e.g. 1 to 4 hours) before one or more of the properties will degrade or become non-existent. Advantageously, in a preferred embodiment, the 2K ink systems of the present invention will exhibit a pot-life of at least 24 hours.

One particular class of resins that helps impart superior mineral oil rub resistance in the present invention are plasticizing polyurethane resins. Preferably, aromatic polyether polyurethanes are used as plasticizing polyurethane resins. Plasticizing aromatic polyether polyurethane resins suitable for the present invention include, but are not limited to, Surkopak 5323 (BIP Oldbury Limited), which is supplied as a solution in ethyl acetate and isopropyl alcohol.

The inks of the present invention typically comprise about 20 wt % to about 80 wt % of a plasticizing polyurethane resin solution, based on the total weight of the composition, based on the end use requirements. For example, the inks of the present invention may comprise about 20 wt % to about 70 wt % plasticizing polyurethane resin solution, based on the total weight of the composition; or about 20 wt % to about 60 wt %; or about 20 wt % to about 50 wt %; or about 20 wt % to about 40 wt %; or about 20 wt % to about 30 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 80 wt %; or about 40 wt % to about 70 wt %; or about 40 wt % to about 60 wt %; or about 40 wt % to about 50 wt %; or about 50 wt % to about 80 wt %; or about 50 wt % to about 70 wt %; or about 50 wt % to about 60 wt %; or about 60 wt % to about 80 wt %; or about 60 wt % to about 70 wt %; or about 70 wt % to about 80 wt %. In certain embodiments, the inks of the present invention contain about 30 wt % to about 70 wt % plasticizing polyurethane resin solution, such as about 60 wt %.

The plasticizing polyurethane resin solutions typically have a solids content (resin solids) of about 10% to about 90%. Therefore, the inks of the present invention typically comprise about 2 wt % to about 75 wt % resin solids, based on the total weight of the composition. For example, the inks of the present invention may comprise about 5 wt % to about 75 wt %; or about 5 wt % to about 70 wt % resin solids, based on the total weight of the composition; or about 5 wt % to about 60 wt %; or about 5 wt % to about 50 wt %; or about 5 wt % to about 40 wt %; or about 5 wt % to about 30 wt %; or about 5 wt % to about 20 wt %; or about 5 wt % to about 10 wt %; or about 10 wt % to about 75 wt %; or about 10 wt % to about 70 wt %; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 75 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 75 wt %; or about 30 wt % to about 70 wt %; or about 30 wt % to about 60 wt %; or about 30 wt % to about 50 wt %; or about 30 wt % to about 40 wt %; or about 40 wt % to about 75 wt %; or about 40 wt % to about 70 wt %; or about 40 wt % to about 60 wt %; or about 40 wt % to about 50 wt %; or about 50 wt % to about 75 wt %; or about 50 wt % to about 70 wt %; or about 50 wt % to about 60 wt %; or about 60 wt % to about 75 wt %; or about 60 wt % to about 70 wt %. In one embodiment, the ink of the present invention comprise about 2 wt % to about 72 wt % plasticizing polyurethane resin solids, based on the total weight of the composition.

Nitrocellulose (NC) resins are also preferred, because they typically provide a good wetting medium for pigment dispersions i.e. nitrocellulose colorant bases. When colored, the inks of the present invention typically comprise about 20 wt % to about 50 wt % NC colorant base, based on the total weight of the composition. For example, the inks of the invention may comprise about 20 wt % to about 40 wt % NC colorant base, based on the total weight of the composition; or about 20 wt % to about 30 wt %; or about 30 wt % to about 50 wt %; or about 30 wt % to about 40 wt %; or about 40 wt % to about 50 wt %.

The NC colorant bases typically contain about 25 wt % to 30 wt % colorant, and about 5 wt % to 10 wt % NC resin, with the remainder being solvent. Thus, the NC resin is present in the ink or coating composition in an amount of about 1 wt % to about 5 wt %, based on the total weight of the ink or coating composition.

The compositions of the invention preferably do not contain any resins other than polyurethane and nitrocellulose. However, in some embodiments, a small amount of additional resins may be included. There is no particular limitation on the other resins that could be used in addition to the aforementioned plasticizing polyurethane resins. Examples include, but are not limited to, alkyds, phenolics, polyamides, vinyls, acrylics, rosin esters, hydrocarbons, polyurethane, epoxies, polyesters, styrenes, ureas, and melamine-formaldehydes. Additional resins may be present in an amount of 0 wt % to about 5 wt %, based on the total weight of the composition.

There is no particular limitation on the solvents that could be used in the inks of the present invention. Examples include aliphatic hydrocarbons, cyclic hydrocarbons, aromatic hydrocarbons, ketones, aldehydes, alcohols, ethers, and esters. The solvents may be part of dispersions or solutions of components (e.g. resins, waxes, etc.), or may be added in addition to the solvents present in the dispersions or solutions. Additional solvents (i.e. not part of the dispersions or solutions) are typically included in the inks of the present invention in an amount of about 20 wt % to about 80 wt %, based on the total weight of the composition. For example, the inks of the present invention may comprise about 20 wt % to about 70 wt % additional solvents, based on the total weight of the composition; or about 20 wt % to about 60 wt %; or about 20 wt % to about 50 wt %; or about 20 wt % to about 40 wt %; or about 20 wt % to about 30 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 80 wt %; or about 40 wt % to about 70 wt %; or about 40 wt % to about 60 wt %; or about 40 wt % to about 50 wt %; or about 50 wt % to about 80 wt %; or about 50 wt % to about 70 wt %; or about 50 wt % to about 60 wt %; or about 60 wt % to about 80 wt %; or about 60 wt % to about 70 wt %; or about 70 wt % to about 80 wt %. In certain embodiments, the inks of the present invention contain about 30 wt % to about 70 wt % plasticizing polyurethane resin solution, such as about 60 wt %.

The inks of the present invention may also include waxes. Suitable waxes include, but are not limited to, amide wax dispersions, polyethylene wax dispersions, amide wax, erucamide wax, polypropylene wax, paraffin wax, polyethylene wax, polytetrafluoroethylene (Teflon), carnauba wax, and the like. The wax may be a combination of waxes. When present, the inks of the present invention typically comprise waxes in an amount of about 1 wt % to about 10 wt %, based on the total weight of the composition. In preferred embodiments, waxes are present in an amount of about 5 wt % to about 5.5 wt %, based on the total weight of the composition.

As with most ink and coating compositions, additives may be incorporated to enhance various properties. Additives include, but are not limited to, adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, and combinations thereof. When present, additives are typically present in an amount of about 0.1 wt % to about 5 wt %, based on the total weight of the composition.

There is no particular limitation on the colorants used in the inks of the present invention. In a preferred embodiment, the colorants chosen would impart stable viscosity and rheological properties to the inks.

The colorant may be any pigment that can be employed in printing inks. It may be organic or inorganic and may be a dye or pigment. Typical examples of useable colorants include, but are not limited to, inorganic pigments, such as Pigment White 6 (Titanium Dioxide), Pigment Black 7 (carbon black), Pigment Black 11 (Black Iron Oxide), Pigment Red 101 (Red Iron Oxide) and Pigment Yellow 42 (Yellow Iron Oxide); and organic pigments such as Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26 Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23 and the like. The dyes include but are not limited to azo dyes, anthraquinone dyes, xanthene dyes, azine dyes, and combinations thereof.

In a preferred embodiment, the colorants of the present invention would be introduced as pigment dispersions, more preferably as nitrocellulose-based pigment dispersions. Examples of suitable pigment dispersions include, but are not limited to, the 0345 and 0392 series of nitrocellulose-based pigment dispersions from Sun Chemical. It would also be possible to introduce the pigments into the ink by well-known milling techniques (e.g. 3-roll milling, ball milling, etc.).

The inks of the present invention can be applied via virtually any printing method, such as lithography, flexography, letterpress, gravure, digital, screen, etc. A preferred printing method is flexography.

In a preferred embodiment, the non-woven substrates used in conjunction with the inks and methods of the present invention would be subjected to surface treatment, to increase the surface tension of the substrate. Such treatments make the substrate more receptive to inks and coatings. For example, the surface of the non-woven substrate may be subjected to corona treatment. Corona treatment is a plasma surface treatment. Corona treatment is conducted by applying a high voltage to small diameter electrode tips, causing a corona discharge to be created. The corona discharge is a visible plasma curtain that has the ability to partially ionize the air around it. As a substrate passes under the corona discharge, the surface is bombarded by ions, increasing the surface energy of the substrate. The non-woven substrates were corona treated an Enercon Sheet Treater equipped with an Enercon COMPAK 2000 energy source (generator) (Enercon Industries Corporation), with an energy output from the generator of 0.5 kW to 3.0 kW, at a line speed of 100 feet per minute. The level of corona treatment for the non-woven substrates used in the examples below was 2 kW/100 fpm (i.e. 2 kW output of the generator, at a line speed of 100 feet per minute). But it is to be understood that the corona treatment level would preferably fall into a range of 0.5 kW/100 fpm to 3 kW/100 fpm, more preferably 1.5 kW/100 fpm to 2.5 kW/100 fpm. The corona treated non-woven substrates would preferably exhibit a surface energy ranging from 30 dynes/cm to 50 dynes/cm at 72° F., more preferably 37 dynes/cm to 44 dynes/cm at 72° F. Without surface treatment, the non-woven substrates will typically exhibit poor IAR mineral oil rub resistance.

In a preferred embodiment, the 1K and 2K ink systems and methods of the present invention will meet stringent customer demands for mineral oil crock resistance.

In another preferred embodiment, the 2K ink systems and methods of the present invention will either: (a) retain their resistance properties for a longer period of time after inoculation; and/or (b) can be re-inoculated multiple times while still maintaining their resistance properties.

In another preferred embodiment, the ink systems and methods of the present can be used in a 1K system as supplied, and do not require catalyst.

In another preferred embodiment, the 2K inks of the present invention will preferably exhibit pot-life of at least 24 hours.

In another preferred embodiment, the 1K inks of the present invention will preferably exhibit shelf-life stability of at least 6 months, more preferably at least 2 years.

Preferably, in one embodiment, the 1K and 2K inks and inventive methods of the present invention exhibit an IAR mineral oil crock resistance rating of equal to or greater than 4.0, more preferably equal to or greater than 4.5, when applied to print treated non-woven substrates.

EXAMPLES

The following examples illustrate specific aspects of the present invention, and are not intended to limit the scope thereof in any respect, and should not be so construed.

Methods

Print Preparation

Prior to printing, the non-woven substrate was corona treated to using an Enercon Sheet Treater equipped with an Enercon COMPAK 2000 energy source (generator) (Enercon Industries Corporation), with an energy output from the generator of 2.0 kW at a line speed of 100 feet per minute. For testing purposes, Examples 2A to 2C inks were freshly prepared by blending the specified varnish with the specified color base, and were subsequently either: (a) dosed with 15% freshly prepared Example 3 Hardener for 2K print samples ("freshly" indicates within 30 minutes of preparation of the inks and hardener); or (b) printed without the use of hardener for 1K print samples, as indicated. Comparative Example 5 ink is a 1K system, printed without added catalyst. Comparative Example 6 is a 2K system, wherein hardener is added to the ink prior to printing. All inks were adjusted to print viscosity using 0-20% ethanol (EtOH) as needed. Inks were applied using a manual flexographic proofer (165 line 9.0 vol) onto a corona treated (2 kW/100 fpm) non-woven substrate. Prints were then dried with an air gun and subsequently allowed to sit for at least 24 hours before testing was performed. Unless specified otherwise, the non-woven substrate was spunbond polypropylene.

IAR Crock Ink Abrasion Resistance Test

IAR crock rub resistance was tested using a Gakushin-type rubbing tester Model RT-300 (available from DAIEI KAGAKU SEIKI), having 6 rub stations (i.e. 6 print beds coupled with 6 rub heads). Print samples were cut into 9 inch by 1 inch strips. The strips were placed flat on the bed of the tester, print side up, and clamped with light tension to ensure they remained in place during testing. A cotton receptor cloth (receptor swatch) was placed on each corresponding 200 g rub head. Using a precision pipette, about 0.25 ml (0.22 g) of mineral oil was applied to each print sample. The counter was set to 15 cycles (i.e. 15 rubs of each print sample), with a stroke length of 4 inches. A control receptor cloth swatch was obtained by rubbing on an unprinted nonwoven substrate. At the end of the rub test each receptor cloth swatch was retained for evaluation.

Assessing Ink Transfer (IAR Rating)

Once the receptor cloth swatch was removed from the rub tester and allowed to dry, a spectrophotometer was used to measure the $\Delta E_{CMC}$ of the cotton fabric with the ink stain versus the control receptor cloth swatch. That is, the color difference between the test swatch and the control swatch was determined. An X-Rite SpectroEye model spectrophotometer, using Sun Color Box I/SunMatch software, was used, with the following instrument settings:

Physical filter—no
White base—Abs
Illuminant—C
Observer angle—2 degrees
Density standard—ANSI T
C+ formula—as indicated in the specifications; Standard Delta E*(CIE 1976) or Delta E*(CMC)

All measurements were taken over PG2000 paper. It is important to measure the ink stain on the test fabric (measuring outside the ink will give artificially low values). The test area should cover as much of the ink traces as possible to represent the ink that actually came off during the rub test. Each swatch was tested with 5 SpectroEye readings, taken in the 5 most crock evident (i.e. most ink transfer) parts of the swatch. Typically, this would be in one of each of the 4 quadrants of the cloth, plus one more reading in the center area. The control swatch provided the background values. Averages were then calculated to determine a $\Delta E_{CMC}$ value, which was then converted to an IAR value rating using the following equations:

$$\Delta E_{CMC} = \sqrt{(\Delta L/S_L)^2 + (\Delta C/cS_c)^2 + (\Delta H/S_H)^2}$$

$$y = q_0\left(1 + \frac{bx}{a}\right)^{\frac{1}{b}}$$

$$y = 5.04 * \left(1 + 0.47 * \frac{\Delta E_{CMC}}{14.70}\right)^{\frac{1}{0.47}}$$

$\Delta E_{CMC}$ is determined as described above; "y" is the IAR rating, calculated as shown in the equations above.

IAR results are reported on a 0 to 5 rating scale, with 0 being the worst (i.e. most ink transfer) and 5 being the best (i.e. no ink transfer), as follows:

0 to 3.0 indicates substantial ink removal and is considered a poor/failing rating.
3.0 to 3.9 indicates moderate ink removal and is considered a failing rating.
4.0 to 4.4 indicates a small amount of ink removal and is considered a fair/passing rating.
≥4.5 indicates a trace amount or complete absence of ink removal and is considered an excellent/passing rating.

Example 1. Inventive Varnish

A varnish of the invention was prepared according to the formulation shown in Table 1. The materials were blended together until a homogeneous composition was obtained. Surkopak 5323 is plasticizing aromatic polyether polyurethane dispersion in ethyl acetate/isopropanol (75% polyurethane resin, based on the total weight of the dispersion; 18 wt % ethyl acetate, based on the total weight of the dispersion; 7 wt % isopropanol based on the total weight of the dispersion).

TABLE 1

Inventive varnish Ex. 1

| Material | Description | wt % |
| --- | --- | --- |
| n-propyl Acetate | solvent | 28 |
| Surkopak 5323 (75% solids) | Plasticizing aromatic polyether polyurethane | 60 |
| LubaPrint 161/S (40% solids) | amide wax dispersion | 6 |
| LubaPrint 232/D (50% solids) | polyethylene wax dispersion | 6 |
| Total | | 100 |

Example 2. Inventive Finished Inks 2A to 2C

Color bases were mixed with the varnish of Example 1, in according to the formulations in Table 2. The materials were blended together until homogeneous. The color bases used are nitrocellulose (NC) pigment dispersions available from Sun Chemical under the trade name 0345 series or 0392 series.

TABLE 2

Inventive finished inks 2A to 2C

| Material | Ex. 2A (cyan) (wt %) | Ex. 2B (rubine) (wt %) | Ex. 2C (cyan) (wt %) |
| --- | --- | --- | --- |
| Ex. 1 varnish | 50 | 50 | 50 |
| Cyan Base[1] | 50 | | |
| Rubine Base[2] | | 50 | |
| Cyan Base[3] | | | 50 |
| Total | 100 | 100 | 100 |

[1]GS Cyan Blue 2495452-0345 NC pigment dispersion
[2]Red 57 04100046-0345HS NC pigment dispersion
[3]GS Cyan Blue 2495452-0392 NC pigment dispersion
The pigment dispersions contain about 36% solids (about 28% pigment, and about 8% nitrocellulose resin).

Example 3. Hardener Composition

A hardener composition, containing an aliphatic polyisocyanate catalyst, was prepared according to the formulation in Table 3.

TABLE 3

Hardener composition

| Material | Description | wt % |
| --- | --- | --- |
| Desmodur N3200 | aliphatic polyisocyanate | 80 |
| n-propyl Acetate | solvent | 20 |
| Total | | 100 |

Materials were blended together until homogenous.

Example 4A. Comparative Varnish Ex. 4 and Finished Inks 4A and 4B

Comparative varnish Example 4 was prepared similarly to Example 1 varnish, except that Tego VariPlus 1201 TF, a polyurethane polyol resin dispersion (in ethyl acetate; 49 wt % solids), was used instead of Surkopak 5323. Comparative finished ink Examples 4A (cyan) and 4B (rubine) were prepared similarly to inventive inks Examples 2A and 2B, by blending 50 parts Example 4 varnish with 50 parts of cyan and rubine pigment dispersions respectively (identical NC pigment dispersions used in Examples 2A and 2B). Then 15% Example 3 hardener was added to Examples 4A and 4B inks.

Example 4B. Ink Abrasion Resistance (IAR) Rating Ratings of Finished Inks 2A to 2C, 4A, and 4B The crock rub resistance of the finished inks was tested, as described above, to give an IAR rub test rating. The IAR rub test rating is shown in Table 4.

TABLE 4

IAR rub ratings of finished inks 2A to 2C, 4A, and 4B.

| Printed Ink Example | IAR rub test rating |
| --- | --- |
| Ex. 2A w/15% Ex 3 Hardener | 4.6 (pass/excellent) |
| Ex. 2B w/15% Ex 3 Hardener | 4.6 (pass/excellent) |
| Ex. 4A w/15% Ex 3 Hardener | 3.4 (fail) |
| Ex. 4B w/15% Ex 3 Hardener | 3.7 (fail) |
| Ex. 2A w/o Hardener | 4.7 (pass/excellent) |
| Ex. 2C w/o Hardener | 4.7 (pass/excellent) |

As shown in Table 4, the inventive inks (Examples 2A to 2C) and method performed far better than the comparative inks (Examples 4A and 4B). Furthermore, inventive inks (Examples 2A and 2C) were shown to have excellent IAR results without the use of hardener.

Perhaps the most surprising thing about the results in Table 4 is the excellent IAR rating for Examples 2A and 2C inks without any hardener, that is, as a 1K system. Applicants are not aware of any existing 1K inks that impart IAR rating of greater than 4.5, or, even more surprisingly, consistently greater than 4.0. Only after the addition of catalyst do currently existing prior art inks exhibit preferably high IAR ratings.

Example 5. Comparative 1K Ink Example 5 Compared to Inventive 1K Ink Example 2A Printed on Various Non-Woven Substrates Comparative Example 5 ink is SunSpectro Solvawoven Cyan, available from Sun Chemical. The SunSpectro Solvawoven series of inks are urethane varnishes with urethane base pigment dispersions.

Using the print preparation method described for a 1K ink (i.e. no catalyst), a series of prints were made using comparative Example 5, and inventive Example 2A. Prints were made on various non-woven substrates and IAR results are shown in Table 5. To further show the advantages of the present invention, the Example 5 ink was also tested after being overprinted with SYSPS 010 (Sun Chemical) overprint varnish (OPV).

TABLE 5

IAR rub ratings of Ex. 5 and Ex. 2A printed on various non-woven substrates

| Ink Example | Non-Woven Substrate | IAR Rating |
|---|---|---|
| Comp. Ex. 5 | SM10135ON | 4.49 |
| Comp. Ex. 5 w/OPV | SM10135ON | 4.63 |
| Inv. Ex. 2A | SM10135ON | 4.95 |
| Comp. Ex. 5 | SN30170US | 4.38 |
| Comp. Ex. 5 w/OPV | SN30170US | 3.28 |
| Inv. Ex. 2A | SN30170US | 4.60 |
| Comp. Ex. 5 | SM10120UN | 4.43 |
| Comp. Ex. 5 w/OPV | SM10120UN | 4.69 |
| Inv. Ex. 2A | SM10120UN | 4.89 |
| Comp. Ex. 5 | Kamisoft | 4.18 |
| Comp. Ex. 5 w/OPV | Kamisoft | 4.49 |
| Inv. Ex. 2A | Kamisoft | 4.78 |
| Comp. Ex. 5 | Bico 14 gsm | 3.70 |
| Comp. Ex. 5 w/OPV | Bico 14 gsm | 4.17 |
| Inv. Ex. 2A | Bico 14 gsm | 4.73 |
| Comp. Ex. 5 | SB2 Bond | 3.19 |
| Comp. Ex. 5 w/OPV | SB2 Bond | 3.92 |
| Inv. Ex. 2A | SB2 Bond | 4.86 |

SM101350N and SM10120UN are spunmelt polypropylene non-woven substrates, from Berry Plastics. SN30170US is a spunbond polypropylene non-woven substrate from Berry Plastics. Kamisoft is a spunbond polypropylene non-woven substrate from Berry Plastics. Bico 14 gsm is a bicomponent (i.e. fibers are composed of two polymers—polypropylene/polyethylene) spunbond substrate, with a paper weight of 14 g/m$^2$, from E-J Technology. SB2 Bond is a spunbond polypropylene landscape fabric from Kuert.

As can be seen in Table 5, all of the inventive ink print samples provided better IAR ratings than Example 5 Solvawoven inks on all substrates, including Solvawoven inks coated with OPV. Although the Solvawoven inks obtained a passing rating of IAR equal to or greater than 4.0 on some of the non-woven substrates, none of them achieved the more preferred equal to or greater than 4.5 IAR rating. For some non-woven substrates, the Solvawoven inks fell short of the IAR equal to or greater than 4.0 rating, and thus would be considered failing.

Example 6. Comparative 2K Ink

Comparative 6 ink was Resino Returin 194-50 CYAN 3065-5, designed for non-woven substrates, plus 15% REDIVERS® 300 Promoter 5032 catalyst. Non-woven substrates were printed with Example 6 ink. IAR results were obtained similarly to Example 5. Several different prints were tested, and IAR results ranged from 4.0 to 4.9, showing that comparative Example 6 2K ink had similar performance to inventive Example 2A 1K ink. However, the advantages of inventive Example 2A are threefold: 1) Ex. 2A can be used as a 1K system (i.e. no added catalyst), whereas Ex. 6 cannot (requires addition of catalyst); 2) Ex. 2A has a higher capacity for re-inoculation when used as a 2K ink (see Example 7 below); and 3) Ex. 2A ink has improved pot-life (see Example 7 below).

Example 7. Re-Inoculation, Pot-Life Stability, and Shelf-Life Stability of Inks Aside from exhibiting excellent IAR ratings as both 1K and 2K systems, the inks and method of the present invention have a further advantage, in that they can be re-inoculated with hardener multiple times, while still retaining IAR properties. Comparative example inks, and indeed, all known existing ink systems, are incapable of multiple inoculation without either losing their IAR properties, or gelling and becoming completely unusable.

The re-inoculation success, pot-life stability, and shelf-life stability of Ex. 2A used as a 2K ink system was tested. Using the described print preparation method, inks were printed on polypropylene non-woven substrate from Berry Plastics (B non-woven) or a biocomponent (Bico) non-woven substrate from Innowo (I non-woven). The following pot-life and re-inoculation tests were performed:

(a) Inventive Ex. 2A ink was initially inoculated (1$^{st}$ inoculation), and then used to make prints at various time intervals. Prints were tested for IAR values to determine pot-life stability. Results in Table 6 show usability (i.e. pot-life stability) of at least 24 hours after inoculation. The initial inoculation and all subsequent re-inoculations were done with 15% Ex. 3 hardener.

(b) After a dwell time of 7 days (i.e. left sitting on shelf), inventive Ex. 2A ink from (a) was re-inoculated (2nd inoculation), and tested for IAR values to determine shelf-life stability. Results in Table 6 show usability (i.e. shelf-life stability) for at least 7 additional days.

(c) After an additional dwell time of 7, 8, and 9 days, inventive Ex. 2A ink from (b) was re-inoculated (3$^{rd}$ inoculation), and tested for IAR values to determine shelf-life stability. Results in Table 6 show usability (i.e. shelf-life stability) for at least 9 additional days.

(d) The total elapsed time that Ex. 2A ink was found to be usable (good IAR values, no gelation or excessive increase in viscosity) with 3 separate inoculations was 17 days. At this point the experiment was terminated, but the inventors have every reason to believe that the ink could be re-inoculated additional times, and would remain usable for even longer than the 17 days that are shown in this example.

TABLE 6

Pot-life and re-inoculation shelf-life of Ex. 2A

| Inoculation | Time elapsed after current inoculation | Time elapsed after 1$^{st}$ inoculation | IAR value (B non-woven) | IAR value (B non-woven) |
|---|---|---|---|---|
| 7(a) - 1$^{st}$ | 30 min | 30 min | 4.7 | 4.5 |
|  | 3 hr. | 3 hr. | 4.7 | 4.5 |
|  | 6 hr. | 6 hr. | 4.7 | 4.6 |
|  | 24 hr. | 24 hr. | 4.8 | 4.6 |
| 7(b) - 2$^{nd}$ (7-day lapse after 1$^{st}$ then re-inoculation) | 30 min | 8 days/30 min | 4.9 | 4.9 |
|  | 3 hr. | 8 days/3 hr. | 4.9 | 4.9 |
|  | 5 hr. | 8 days/5 hr. | 4.9 | 4.8 |
| 7(c) - 3$^{rd}$ (7, 8, or 9 day lapse after 2$^{nd}$ inoculation) | 30 min | 15 days/30 min | 4.9 | 4.6 |
|  | 1 day | 16 days | 4.8 |  |
|  | 1 day | 17 days | 4.8 |  |

Ex. 6 comparative ink (Resino Returin 194-50 CYAN 3065-50+REDIVERS® Promoter 5032 catalyst) cannot be re-inoculated, whereas Ex. 2A inventive ink can be re-inoculated multiple times. In accordance with the specifications taken directly from the published product data sheet (PDS) for the Resino inks, once inoculated, the ink is only fully active for 5-8 hours. Thus, a second dose of promoter is recommended after 5-6 hours. The PDS further states that once the ink receives the second dose of Promoter 5032, it will be usable for an addition 5-8 hours, after which time the ink should be discarded. Thus, once the Resino system is initially inoculated, the total amount of time it is usable (including the initial and $2^{nd}$ inoculation) would be 10-14 hours. In comparison, as shown in Table 6, the inventive inks of the present invention would have at least a 24-hour usable life after the initial inoculation, and at least a 17-day usable life with subsequent inoculations.

Example 8. Usability of Inventive Examples as a 1K System

Print samples were prepared as described, using Example 2A ink without the addition of hardener (i.e. as a 1K system). The results are shown in Table 7. Age of ink refers to the time after preparation (i.e. time after the varnish and color base were blended).

TABLE 7

Use of Example 2A as a 1K system.

| Age of ink | IAR value (B non-woven) |
| --- | --- |
| 30 min | 4.4 |
| 4 days | 4.5 |

The results in Table 7 show that Example 2A has a stability of at least 4 days after manufacture. Although the experiment was discontinued after 4 days, the ink is expected to remain usable indefinitely.

Example 9. Comparative 2K Varnish

Comparative Example 9 varnish was prepared, according to the formulation in Table 8.

TABLE 8

Comparative Ex. 9 varnish

| Material | Description | wt % |
| --- | --- | --- |
| n-propyl Acetate | solvent | 16 |
| Surkopak 5323 (75% solids) | Plasticizing aromatic polyether polyurethane | 24 |
| Tego Variplus 1201 TF | Polyurethane polyol resin | 40 |
| Desmophen 1380 BT | Trifunctional polypropylene ether polyol | 8 |
| LubaPrint 161/S (40% solids) | amide wax dispersion | 6 |
| LubaPrint 232/D (50% solids) | polyethylene wax dispersion | 6 |
| Total | | 100 |

Comparative Example 9 exhibited poor IAR ratings.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method of producing a printed non-woven substrate, comprising:
    (a) providing a non-woven substrate, wherein the non-woven substrate has been treated by corona discharge and wherein the substrate has a surface energy of 30 to 50 dynes/cm at 72° F. (22.22° C.) after the corona discharge treatment;
    (b) applying one or more layers of an ink or coating composition (A) to the substrate, wherein the ink or coating composition (A) comprises:
        i. one or more polyurethane resin dispersions, in an amount of 20 wt % to 80 wt %, based on the total weight of the composition, wherein the resin dispersions have a solids content of 40% to 90%, and wherein the polyurethane resin is a solvent-borne plasticizing aromatic polyether polyurethane;
        ii. one or more additional solvents, in an amount of 20 wt % to 80 wt %, based on the total weight of the composition; and
        wherein the ink or coating composition (A) contains no catalysts; and
        wherein the ink or coating composition (A) is a one-part system; and
    (c) drying the ink or coating composition (A) on the substrate;
        wherein the dried ink or coating composition (A) has an ink adhesion rating (IAR) of equal to or greater than 4.0.

2. The method of claim 1, wherein the ink or coating composition (A) comprises 8 wt % to 72 wt % polyurethane resin solids, based on the total weight of the composition.

3. The method of claim 1, wherein the additional solvents are selected from the group consisting of aliphatic hydrocarbons, cyclic hydrocarbons, aromatic hydrocarbons, ketones, aldehydes, alcohols, ethers, esters, and combinations thereof.

4. The method of claim 1, wherein the ink or coating composition (A) further comprises a colorant base, wherein the colorant base is in the form of a pigment or dye dispersed in a nitrocellulose resin.

5. The method of claim 4, wherein the ink or coating composition (A) comprises 20 wt % to 50 wt % of the colorant base, based on the total weight of the composition.

6. The method of claim 1, wherein the ink or coating composition (A) is fully dried at ambient temperature within 24 hours of application to the substrate.

7. The method of claim 1, wherein the ink or coating composition (A) has a pot-life equal to or greater than 6 months after manufacture, and the dried ink or coating composition (A) maintains an ink adhesion rating (IAR) of equal to or greater than 4.0.

8. The method of claim 1, wherein the dried ink or coating composition (A) has an ink adhesion rating (IAR) of equal to or greater than 4.5.

9. The method of claim 1, wherein the ink or coating composition (A) further comprises nitrocellulose.

* * * * *